July 21, 1942.  R. A. FIRESTONE  2,290,615
BED CONSTRUCTION
Filed Nov. 18, 1938   3 Sheets-Sheet 2
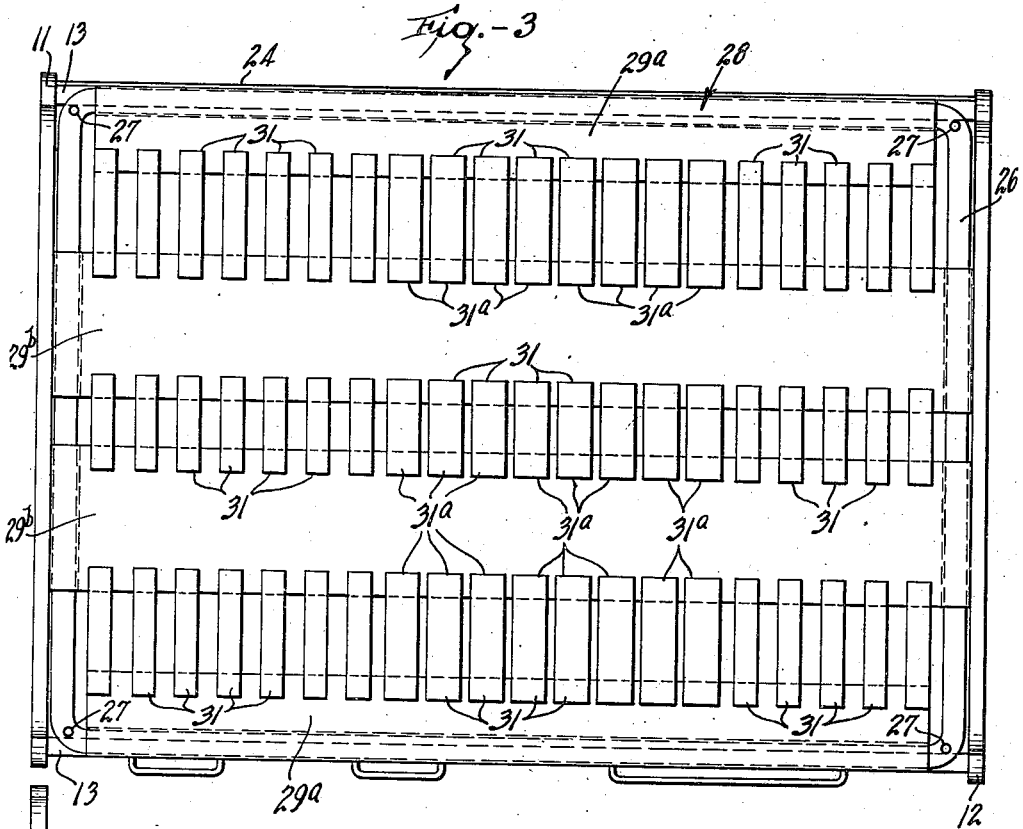
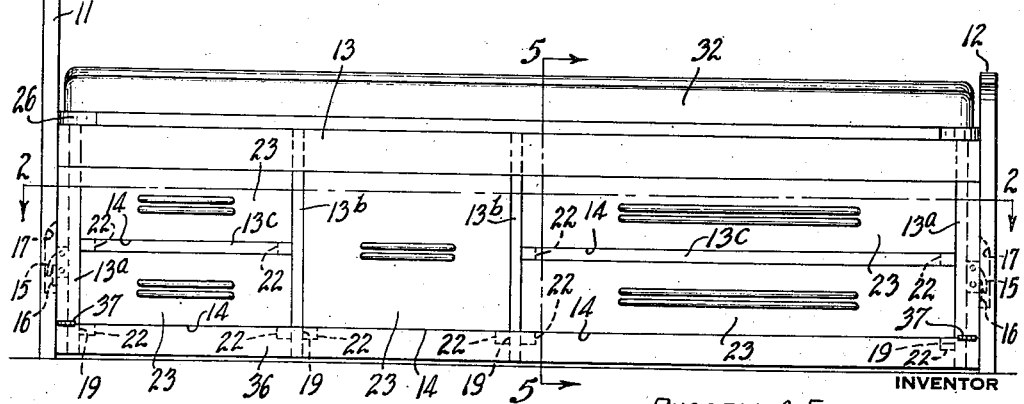
INVENTOR
RUSSELL A. FIRESTONE
BY
ATTORNEYS July 21, 1942.  R. A. FIRESTONE  2,290,615
BED CONSTRUCTION
Filed Nov. 18, 1938    3 Sheets-Sheet 3
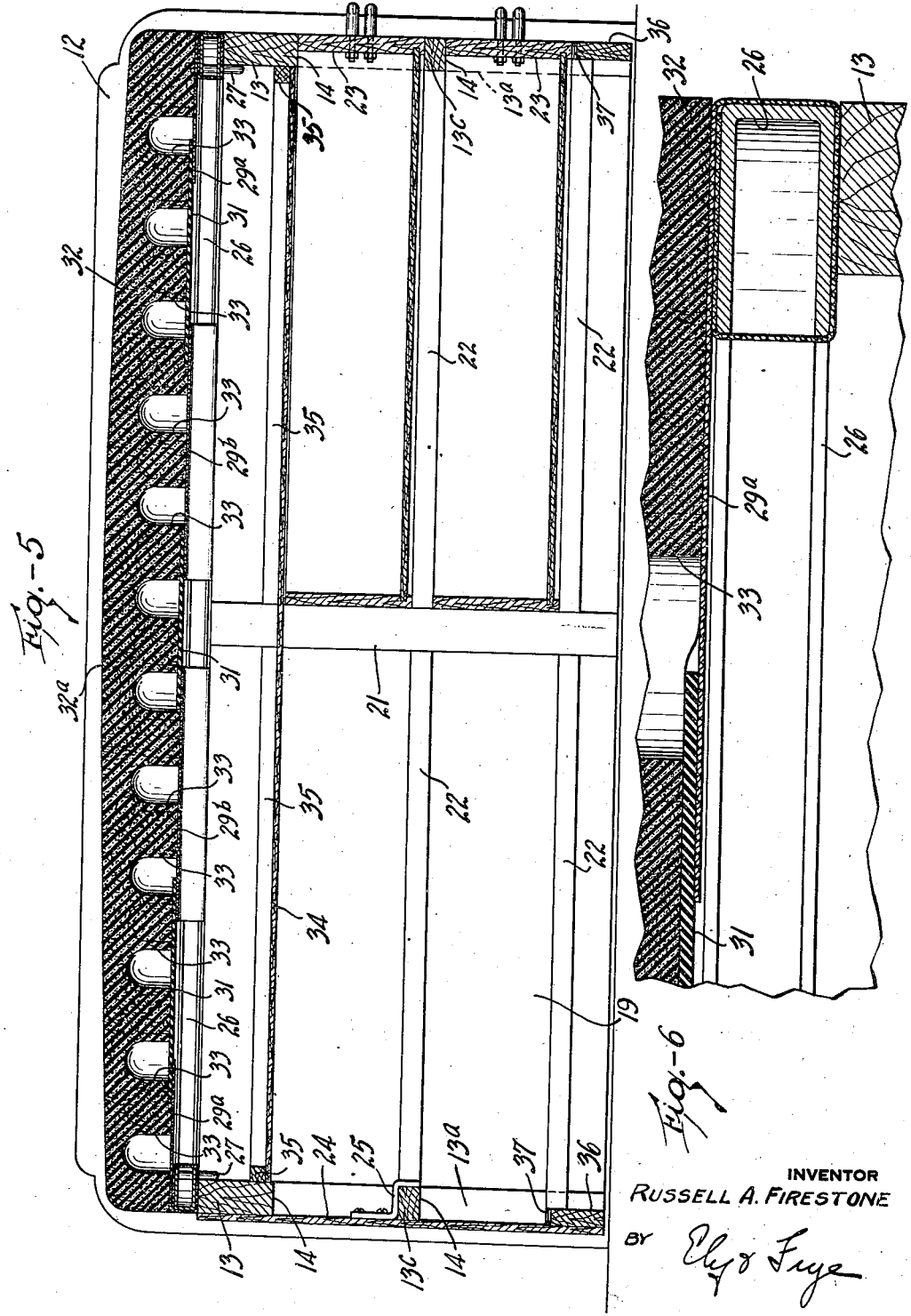
INVENTOR
RUSSELL A. FIRESTONE
BY
ATTORNEYS Patented July 21, 1942

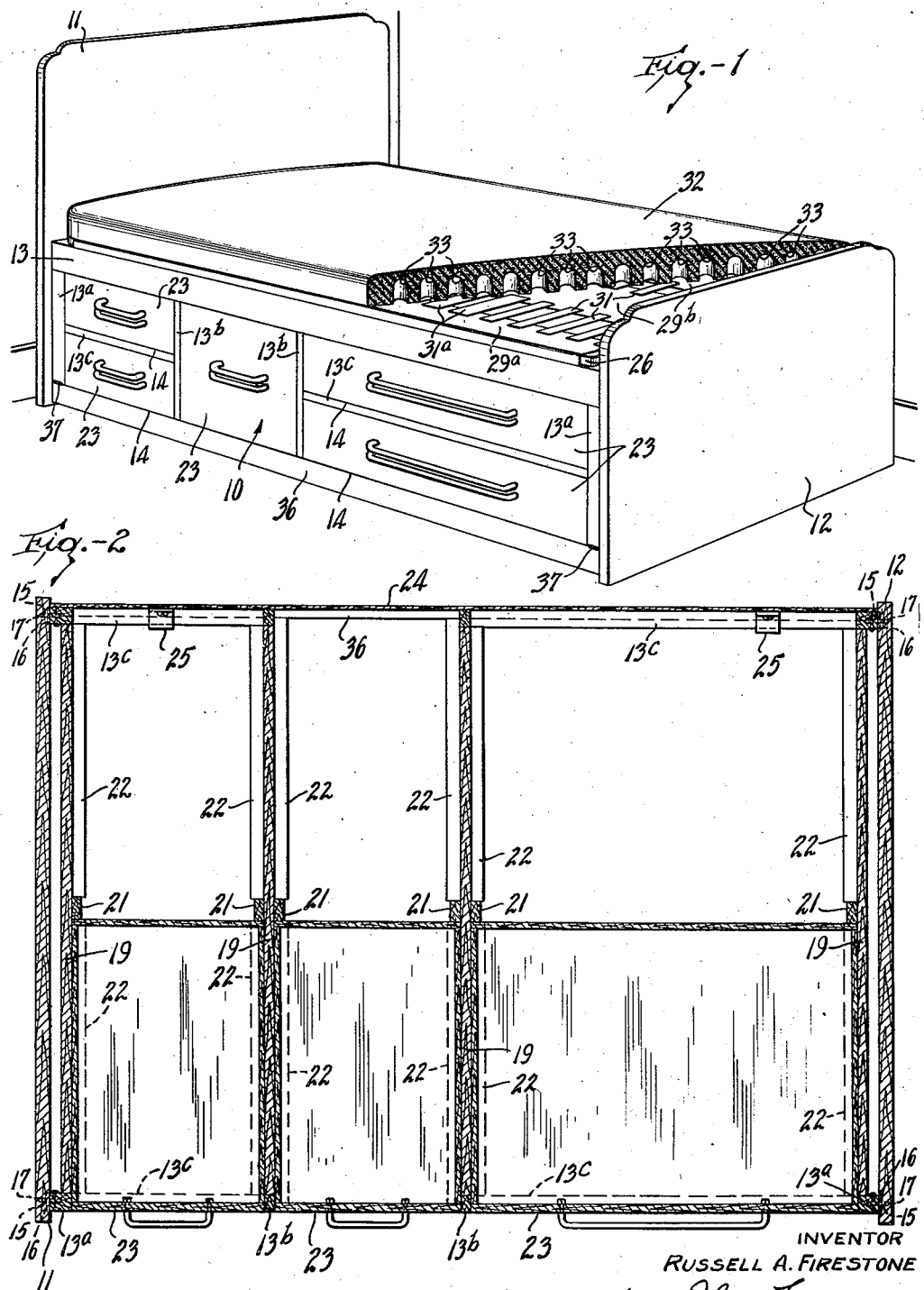

2,290,615

UNITED STATES PATENT OFFICE 2,290,615

BED CONSTRUCTION

Russell A. Firestone, Fairlawn, Ohio, assignor to The Firestone Tire & Rubber Company, Akron, Ohio, a corporation of Ohio Application November 18, 1938, Serial No. 241,186

4 Claims. (Cl. 5—187)

This invention relates to bed constructions generally, more especially to beds which have resilient mattress supporting means and which utilize the bed space in an efficient manner.

It has been observed that standard bed constructions have a space associated therewith which is normally unoccupied and which can be utilized for storage purposes. However, this space is of small volume and heretofore has not been efficiently utilized.

By employing the present invention the utilizable space in a bed construction can be increased and the comfort and supporting properties of the bed improved. This is effected by using a novel rubber mattress and suspension system which is of considerably less depth than the present types of comfortable bed springs, such as box springs.

The general objects of this invention are to provide a bed with a load supporting system of reduced depth whereby increased storage space is provided thereunder; to provide a storage compartment adapted to be removably attached to a standard bed; and to use rubber in the load carrying means of a bed.

Certain specific objects of the invention are to provide a bed with a storage compartment which can readily be cleaned thereunder, drawers accessible from both sides of the bed, a removable cover for a side of the storage space, a rubber-fabric layer which provides a resilient load support, and a porous rubber mattress that compensates for at least a portion of the sag occurring in the rubber-fabric layer when it is loaded.

The foregoing and other objects of the invention will be manifest from the following description.

Reference is now directed to the accompanying drawings in which:

Figure 1 is a perspective view of one embodiment of the invention, a portion of the rubber mattress being broken away to disclose the rubber and fabric mattress support;

Figure 2 is a transverse horizontal cross section on line 2—2 of Figure 4;

Figure 3 is a plan view of the bed of Figure 1, with the mattress removed;

Figure 4 is a side elevation of the bed shown in Figure 1;

Figure 5 is a vertical cross section taken on line 5—5 of Figure 4; and

Figure 6 is an enlarged detail section of a corner of the mattress supporting device of the invention.

The present invention broadly comprises providing a sheet-like mattress supporting layer which is formed from several fabric strips that are bound to each other by a plurality of tensioned rubber strips, the whole being secured to a frame. This supporting layer carries a crowned porous rubber mattress upon which a person can be supported in a comfortable manner. The side rails of the bed carry members which form a side rail assembly that is adapted to position a plurality of drawers in the portion of the bed under the sheet-like supporting layer.

Attention is directed to Figure 1 of the drawings where there is shown a bed frame, or bedstead, indicated generally by 10, which includes a head 11, a foot 12, and side rails 13. In the embodiment of the invention shown, the side rails 13 carry downwardly extending, vertical end pieces 13a, and center members 13b. Horizontally extending braces 13c are secured between the vertically extending members, as shown, to produce apertures 14 in the side rail units. All of the members 13, 13a, 13b, and 13c are made from any suitable material, such as wood. The side rails carry hooked metal arms 15 at their ends, the arms being secured to the side rails by screws or other means and being adapted to engage with metal plates 16 that are secured to the head 11 and foot 12 of the bed. Recesses 17 are formed in the head and the foot behind the plates 16 to receive the arms 15 and permit ready engagement, or disengagement, of the side rails to or from the remainder of the bed.

Figure 2 indicates that joists 19 extend between and form a unitary side rail assembly with the side rails 13 and the members carried thereby. The joists may extend the height of the side rail units, as shown, or be split into several bars at spaced points in vertical planes and they are secured to the end pieces 13a, and center members 13b in any convenient manner. In some cases, the pieces 13a and members 13b may be eliminated by securing the upper portion of the joists to the side rails 13 and having the joists extend the width of the bed. The joists 19 carry vertically extending members 21 in substantially the center axis of the bed 10 for a purpose hereinafter to be described. Brackets, or supporting strips 22, are secured to the joists 19 flush with the lower portions of the apertures 14 formed in the side rail units. Figure 2 shows that the joists 19 extend below the lower edges of the end pieces and center members so that the lower members of the supporting strips 22 are flush with the lower portion of the end pieces and center members. The joists 19 and supporting strips 22 are so constructed and arranged relative to the apertures 14 that drawers 23 are received in the apertures 14 and supported by the strips 22. The drawers can be pushed into the bed, until stopped by the center member 21, as shown in Figure 2.

Since one side of the bed 10 is usually placed against a wall, the drawers 23 are usually positioned on only one side of the bed 10. A removable cover 24 is carried by the side rail unit not having drawers associated therewith to give the bed a finished appearance. The cover is carried on the side rail 13 by a plurality of brackets 25, which are substantially S-shaped in section, and which are adapted to engage with the braces 13C (Figure 5).

Obviously, the cover could be made of any suitable material and it would be omitted when drawers are carried in each side of the bed 10.

In order to provide a load carrying support, a substantially rectangular, metal frame 26 is carried on the upper surface of the bed rails 13. Pins 27 are secured at the four corners of metal frame 26 and project downwardly therefrom in position to abut the inner lateral faces of the bed rails 13, for preventing lateral movement of said frame. The metal frame 26 preferably is made from a substantially U-shaped channelled member, as shown, for it ordinarily must resist appreciable compressive pressure. A supporting sheet 28, made from a plurality of fabric strips 29a, 29b and rubber strips 31, is carried by the metal frame 26. The supporting sheet is formed by securing one edge of each of the fabric strips 29a to one side of the metal frame 26 and the remaining fabric strips 29b are wrapped around the ends of the metal frame and extend tautly the length of the frame in spaced relation to each other and the fabric strips 29a. The edges of all of the fabric strips 29a and 29b are secured together by the rubber strips 31 that are secured to the fabric strips by vulcanization, or in any other suitable manner. Of course, the rubber strips are compounded so that they have high tensile strength and make the supporting sheet 28 resistant to deflection on load application, since the fabric strips, usually formed of rubberized, heavy canvas, do not stretch under load.

Figure 3 shows that the rubber strips 31a in the mid portion of the metal frame 26 are broader, or wider, than the remaining strips so that they are more resistant to deflection under load. Figure 3 also indicates that the center fabric strips 29b are closer together than they are to the fabric strips 29a whereby the rubber strips joining adjacent portions of such fabric strips are shorter than the rubber strips securing the outer fabric strips together. This too, aids in preventing excessive sag of the center of the supporting sheet in either transverse or longitudinal direction, when the supporting sheet is loaded. The resistance of the supporting sheet 28 to deflection is increased by initially stretching the fabric strips 29b tightly in the frame and by tensioning the rubber strips when securing them between the fabric strips.

The bed is completed by a mattress 32, preferably made from porous rubber, as shown. This mattress 32 has a plurality of recesses 33 formed in the under surface thereof to increase the flexibility and softness of the finished mattress. Figure 5 best indicates that the center portion 32a of the mattress 32 is crowned appreciably to compensate for deflection of the supporting sheet when load is applied thereto. The portion 32a is crowned both longitudinally and transversely of the bed. The crowned portion 32a, together with the special construction of the supporting sheet 28, combine to prevent an undesirable amount of sag in the bed when a person is lying thereon.

A covering board 34 should be associated with the side rails 13 and extend therebetween to provide a cover for the drawers 23 and prevent entry of dirt therein. This cover 34 is carried by tacking strips 35 which are secured to the side rails. It will be noted that the board 34 is an appreciable distance below the supporting sheet to permit distortion thereof under load without any bottoming action being effected. The position of the covering board 34 depends upon the load deflection of the supporting sheet 28 and varies with changes in the characteristics of that sheet. Obviously the covering board 34 should be as close to the supporting sheet as possible without bottoming the sheet under normal loads. A comparison of the overall height of the supporting means of the bed 10 with similar means in beds using box spring supports shows that the construction of the invention provides more storage space than is furnished by standard constructions.

The end members 13a carry downwardly extending members 36 at their lower ends to give a finished appearance to the bed. These members 36 are secured to the end members 13a by hinges 37 so that they may be swung outwardly to permit cleaning of the floor space under the bed 10.

The novel supporting system of the bed differentiates over all known types of bed supports. Besides providing a resilient, durable load carrying support, this system dispenses with the use of box springs normally required in bed construction with no decrease, and usually increased, comfort to a person lying on the bed, since the resilient layer of the invention functions to support load in a manner suitable to most people.

A feature of the invention is that the entire volume of space below the load supporting means of a bed is utilized, a major portion being used for storage purposes. Of course, the drawers 23 could be extended to a point immediately adjacent the floor when maximum storage space is desired.

It will be observed that the frame 26 can readily be lifted from the bed 10, with the mattress 32 preferably first being removed therefrom. Then the side rail assembly can be lifted as a unit from the head 11 and foot 12 of the bed by merely disengaging the metal arms 15 from their sockets. In certain cases, it may be advisable to construct the bed 10 with ordinary side rails thereon, the bed then having no storage means associated therewith. The special interchangeable side rail unit could then be provided and substituted for the original side rails.

From the foregoing description it will be seen that a novel bed has been provided and that the objects of the invention have been realized.

While a written description and illustration of one embodiment of the invention is disclosed herein, it will be understood that various modifications can be made without departing from the scope of the invention as defined in the appended claims.

What is claimed is:

1. A resilient mattress support for a bed, said resilient support comprising a substantially rectangular frame, a narrow fabric strip secured along one edge thereof to each side of said frame and free of the ends of said frame, two narrow fabric strips wrapped around spaced portions of the ends of said frame and extending tautly the length of said frame, and a plurality of rubber strips secured to adjacent edges of said fabric strips and tautly extending therebetween, the portion of said rubber strips adjacent the center of the frame being more resistant to deflection than the remainder thereof, the middle members of said fabric strips being relatively close together whereby the rubber strips secured therebetween are shorter than the strips securing the outer strips to the inner strips and the center of said sheet is more resistant to deflection than the edges thereof.

2. A resilient mattress support for a bed, said resilient support comprising a substantially rectangular frame, a narrow fabric strip secured along one edge thereof to each side of said frame and free of the ends of said frame, two narrow fabric strips wrapped around spaced portions of the ends of said frame and extending tautly the length of said frame, and a plurality of rubber strips secured to adjacent edges of said fabric strips and extending tautly therebetween, the rubber strips adjacent the center of the frame being shorter and more resistant to deflection than the remainder thereof.

3. A mattress support comprising a rigid generally rectangular frame having a pair of side members, a pair of end members, and a webbing spanning the space defined by the frame members, said webbing including plural fabric strips engaging the end members to extend tautly therebetween in mutual spaced relation and spaced from the side members, a pair of fabric strips engaging the side members to extend inwardly toward the first mentioned strips, and resilient means connecting adjacent marginal portions of all the strips to provide a resilient webbing, said resilient means comprising a plurality of substantially parallel strips of rubber-like material, said strips being so arranged as to present more resistance to deflection through that area of the webbing centrally of the end members than through the areas adjacent thereto.

4. A resilient mattress support comprising a substantially rectangular rigid frame having side members and end members, a narrow fabric strip secured along each side member, said strips being free of the end members, a plurality of narrow fabric strips having end portions engaging the end members to extend tautly therebetween, and a plurality of resilient elements secured to adjacent edges of the fabric strips to extend tautly therebetween, the elements joining the fabric strips throughout a central area of the space defined by frame members being wider and more closely spaced than the elements joining the fabric strips throughout other portions of said defined area.

RUSSELL A. FIRESTONE.